(12) United States Patent  
Wallner et al.

(10) Patent No.: US 8,241,174 B2
(45) Date of Patent: Aug. 14, 2012

(54) METHOD FOR CONTROLLING A MOTOR VEHICLE DRIVE TRAIN

(75) Inventors: Stefan Wallner, Friedrichshafen (DE); Notker Amann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 732 days.

(21) Appl. No.: 12/160,608

(22) PCT Filed: Jan. 16, 2007

(86) PCT No.: PCT/EP2007/000313
§ 371 (c)(1),
(2), (4) Date: Jul. 11, 2008

(87) PCT Pub. No.: WO2007/085362
PCT Pub. Date: Aug. 2, 2007

(65) Prior Publication Data
US 2010/0227734 A1  Sep. 9, 2010

(30) Foreign Application Priority Data

Jan. 26, 2006 (DE) .................. 10 2006 003 711

(51) Int. Cl.
*B60W 10/02* (2006.01)
(52) U.S. Cl. ............................. 477/5; 477/62
(58) Field of Classification Search ............ 701/55, 701/56, 67, 68; 477/5, 62, 63; 475/5, 150, 475/151, 65, 176, 83, 275; 192/3.28, 3.51; 180/65.265
See application file for complete search history.

(56) References Cited

U.S. PATENT DOCUMENTS

| 4,766,779 | A | * | 8/1988 | Massy ........................ 74/731.1 |
| 5,775,449 | A | * | 7/1998 | Moroto et al. ............ 180/65.235 |
| 5,895,333 | A | * | 4/1999 | Morisawa et al. ................ 475/5 |
| 6,430,483 | B2 | | 8/2002 | Takaoka et al. |
| 6,575,873 | B2 | | 6/2003 | Carl et al. |
| 6,719,655 | B2 | * | 4/2004 | Kramer ............................ 475/5 |
| 6,805,648 | B1 | | 10/2004 | Ehrlinger |
| 6,817,327 | B2 | | 11/2004 | Ehrlinger et al. |
| 6,966,860 | B2 | | 11/2005 | Heitmann et al. |
| 6,994,177 | B2 | | 2/2006 | Ito et al. |
| 7,150,698 | B2 | * | 12/2006 | Sakamoto et al. ................ 477/5 |
| 7,179,187 | B2 | * | 2/2007 | Raghavan et al. ................ 475/5 |
| 7,207,404 | B2 | | 4/2007 | Ito et al. |
| 7,216,751 | B2 | * | 5/2007 | Teraoka ...................... 192/84.6 |

(Continued)

FOREIGN PATENT DOCUMENTS

DE  199 06 871 A1  8/2000

(Continued)

*Primary Examiner* — Troy Chambers
*Assistant Examiner* — Jude Agendia
(74) *Attorney, Agent, or Firm* — Davis & Bujold, P.L.L.C.

(57) ABSTRACT

A method for controlling a drivetrain including a combustion engine, electric motor/generator and a transmission intercoupled, via a summarizing gear, with one output and two input elements and, via a clutch, with each other. One input element is fixed to the engine, the second input element is fixed to the motor/generator and the output element is fixed to the input shaft of the transmission. The clutch is between two elements of the summarizing gear. Before a gearshift, torques of the engine and motor/generator are reduced and the clutch disengaged. To quickly reduce torque in the summarizing gear, the engine torque is reduced after a defined time, such that the clutch disengages when the slippage is proportional to the lowering engine torque and the motor/generator torque, in a ratio of torques at the beginning of torque reduction, is reduced proportionally to the engine torque.

20 Claims, 5 Drawing Sheets

U.S. PATENT DOCUMENTS

| | | | |
|---|---|---|---|
| 7,270,624 B2 * | 9/2007 | Steen et al. | 477/180 |
| 7,351,182 B2 * | 4/2008 | Kobayashi | 477/5 |
| 7,784,575 B2 * | 8/2010 | Yamanaka et al. | 180/65.275 |
| 7,885,737 B2 * | 2/2011 | Hirata et al. | 701/22 |
| 7,954,581 B2 * | 6/2011 | Tanishima | 180/65.275 |
| 8,002,059 B2 * | 8/2011 | Tanishima | 180/65.275 |
| 2002/0123407 A1 * | 9/2002 | Hanyu et al. | 475/5 |
| 2004/0152558 A1 * | 8/2004 | Takami et al. | 477/3 |
| 2004/0230360 A1 * | 11/2004 | Matsumura et al. | 701/51 |
| 2005/0155803 A1 * | 7/2005 | Schiele | 180/65.2 |
| 2005/0283298 A1 * | 12/2005 | Ochi et al. | 701/67 |
| 2006/0011395 A1 * | 1/2006 | Sugiyama et al. | 180/65.4 |
| 2006/0073937 A1 * | 4/2006 | Tohta et al. | 477/62 |
| 2006/0089235 A1 * | 4/2006 | Kobayashi | 477/107 |
| 2006/0111213 A1 * | 5/2006 | Bucknor et al. | 475/5 |
| 2006/0258506 A1 * | 11/2006 | Ibamoto et al. | 477/5 |
| 2007/0123384 A1 * | 5/2007 | Schon et al. | 475/275 |
| 2007/0150158 A1 * | 6/2007 | Inoue et al. | 701/93 |
| 2007/0276557 A1 * | 11/2007 | Motosugi et al. | 701/22 |
| 2008/0015760 A1 * | 1/2008 | Yamauchi | 701/67 |
| 2008/0083579 A1 * | 4/2008 | Okuda et al. | 180/293 |
| 2008/0096717 A1 * | 4/2008 | Houle et al. | 477/5 |
| 2008/0215221 A1 * | 9/2008 | Baehr et al. | 701/68 |
| 2009/0037061 A1 * | 2/2009 | Tabata et al. | 701/55 |
| 2009/0055063 A1 * | 2/2009 | Nakamura et al. | 701/60 |
| 2009/0093936 A1 * | 4/2009 | Lindgren et al. | 701/55 |
| 2009/0149294 A1 * | 6/2009 | Wallner et al. | 477/4 |
| 2009/0216413 A1 * | 8/2009 | Baldet et al. | 701/54 |
| 2009/0229393 A1 * | 9/2009 | Shibata et al. | 74/335 |
| 2009/0298634 A1 * | 12/2009 | Ren et al. | 475/5 |
| 2009/0305832 A1 * | 12/2009 | Matsubara et al. | 475/150 |
| 2009/0312922 A1 * | 12/2009 | Tanaka et al. | 701/56 |
| 2010/0004836 A1 * | 1/2010 | Karlsson et al. | 701/67 |
| 2010/0030438 A1 * | 2/2010 | Brattberg et al. | 701/67 |
| 2010/0087290 A1 * | 4/2010 | Schoenek et al. | 477/5 |

FOREIGN PATENT DOCUMENTS

| | | |
|---|---|---|
| DE | 199 34 696 A1 | 5/2001 |
| DE | 101 22 713 A1 | 2/2002 |
| DE | 101 40 424 A1 | 2/2003 |
| DE | 101 52 471 A1 | 5/2003 |
| DE | 103 11 885 A1 | 10/2003 |
| EP | 1 090 792 A2 | 4/2001 |
| EP | 1 319 546 A1 | 6/2003 |
| EP | 1 439 087 A2 | 7/2004 |
| GB | 2 386 932 A | 10/2003 |

* cited by examiner

METHOD FOR CONTROLLING A MOTOR VEHICLE DRIVE TRAIN

This application is a national stage completion of PCT/EP2007/000313 filed Jan. 16, 2007, which claims priority from German Application Serial No. 10 2006 003 711.1 filed Jan. 26, 2006.

FIELD OF THE INVENTION

The invention relates to a method for controlling a motor vehicle drivetrain which comprises one internal combustion engine, one electric motor/generator and one transmission which are intercoupled by way of a summarizing gear, having two input elements and one output element, and a lock-up clutch designed as a friction clutch in which the first input element is rotatably fixed to the crankshaft of the internal combustion engine. The second input element is rotatably fixed to the rotor of the electric motor/generator and the output element is rotatably fixed to the input shaft of the transmission and in which the lock-up clutch is situated between two elements of the summarizing gear, wherein prior to a gearshift, the torques of the internal combustion engine and of the electric motor/generator are reduced and the lock-up clutch is disengaged.

BACKGROUND OF THE INVENTION

A drivetrain of a motor vehicle of the above mentioned kind has been disclosed in DE 199 34 696 A1 and DE 101 52 471 A1. In this known drivetrain, the summarizing gear is, in each case, made as a simple planetary gear with one sun gear, one planet carrier with several planetary gears and one ring gear. The ring gear forms the first input element and is rotatably fixed to the crankshaft of the internal combustion engine. The sun gear forms the second input element and is rotatably coupled with the rotor of the electric motor/generator. The planet carrier forms the output element and is rotatably connected with the input shaft of the shift transmission. The lock-up clutch is located between the sun gear and the planet carrier of the planetary transmission.

In the drivetrain, according to DE 199 34 696 A1, the lock-up clutch, unlike the construction assumed here, is designed as a dog clutch so that the lock-up clutch can be engaged only during synchronous running of the internal combustion engine and of the input shaft of the shift transmission thus being utilizable only with limitations. To make driving the motor vehicle only with the electric motor/generator possible, a directional free wheel is disposed between the crankshaft and a housing part whereby the crankshaft is protected against a reverse turn and thus the input torque of the electric motor/generator is supported against the housing. To make starting the internal combustion engine possible while the motor vehicle is stationary, one other directional free wheel is disposed between the input shaft of the shift transmission and a housing part whereby the input shaft is protected against a reverse turn and thus the input torque of the electric motor/generator is supported against the housing.

In the drivetrain, according to DE 101 52 471 A1, the lock-up clutch, such as assumed for the instant invention, is designed as a friction clutch so that the lock-up clutch can also be used in case of a speed difference between the input shaft of the shift transmission and the internal combustion engine for transmitting a torque in the slip operation. When the motor vehicle is stationary and the transmission shifted to idling speed, to make an impulse start of the internal combustion engine with the electric motor/generator possible, one other friction clutch is situated between the input shaft of the shift transmission and a housing part whereby the input shaft, after reaching a starting rotational speed of the electric motor/generator can be decelerated for starting the internal combustion engine.

In the description of the invention and without limiting the scope of protection, herebelow the point of departure by way of example is an extensively identical construction of the drivetrain wherein the lock-up clutch is assumed as a friction clutch, particularly as a wet multi-disc clutch, but alternatively can also be designed as a dry clutch. Alternative to the known arrangement, the lock-up clutch can also be situated between the ring gear and the sun gear, that is, between the crankshaft of the internal combustion engine and the rotor of the electric motor/generator.

In the normal driving operation, the lock-up clutch is completely engaged so that the planetary transmission is blocked and rigidly rotates. In this state of operation, the rotational speeds and the direction of rotation of the internal combustion engine of the electric motor/generator and of the input shaft of the shift transmission are identical. In this state, the electric motor/generator is operated predominantly as generator for supplying the electric vehicle circuit, but in certain operating situations, especially in acceleration phases of the motor vehicle, it can also be operated as a motor.

Upon appearance of a gearshift requirement which, according to operating parameters of a control device, can be triggered automatically or by the driver manually actuating a shift control element, such as a shift lever in a manual shifting gate or a shift paddle disposed behind the steering wheel, a drivetrain of this sort, immediately prior to the gearshift has to be made extensively torque free within the shift transmission. Moreover, the lock-up clutch has to be entirely open in order to make possible within the summarizing gear a rotational speed compensation determined by the speed ratio change. It is altogether achieved hereby to make possible that the activated load gear be torque free de-activated and the target speed to be activated be load-free synchronized and subsequently activated. The load freedom in the shifting and synchronizing elements concerned makes low shifting forces possible, slight wear on the shift clutches and on the synchronizing elements, short shifting times and great shifting comfort.

Hitherto it had been usual for this purpose to reduce to zero the torque of the internal combustion engine and of the electric motor/generator independently of each other and to open the lock-up clutch without coordination therewith. As a result of the relatively quick response behavior of the electric motor/generator and of the lock-up clutch, the same as the relatively slow response behavior of the internal combustion engine, this can lead to undesired compensation motions within the summarizing gear which can lead to inadmissibly high rotational speeds and high loads produced by inertia.

In a design of the summarizing gear as planetary transmission in the known arrangement according to DE 101 52 471 A1, in this situation, it is thus possible that a quickly load-free, shifted electric motor/generator and a prematurely disengaged lock-up clutch lead to an acceleration of the internal combustion engine combined with an extremely high rotation of the electric motor/generator in opposite direction. Hereby damages can occur, both in the electric motor/generator and also in the planetary transmission. Moreover, the rotational speed differences caused at the same time in the planetary transmission make difficult and extend the subsequent synchronization of the target gear and the synchronization to be carried out after the gearshift between the internal combustion engine and the input shaft of the shift transmission.

With this background, the instant invention is based on the problem of indicating a method with which, in a drivetrain of the aforementioned kind, the torque reduction and the disengagement of the lock-up clutch, prior to a gearshift, can be carried out in the summarizing gear as quickly as possible without changes in rotational speed. Such a method is utilizable also in drivetrains containing similar components, but in different input coupling combination. It is to be taken into consideration at the same time that the internal combustion engine can be in the traction or coasting operation, the lock-up clutch can be from a completely disengaged state via a partly engaged to an entirely engaged (with overpressure) state and the electric motor/generator be precisely operated as generator or as motor or be shifted precisely without power.

SUMMARY OF THE INVENTION

The invention concerns a method for controlling a motor vehicle drivetrain which comprises one internal combustion engine, one electric motor/generator and one transmission which are intercoupled by a summarizing gear having two input elements and one output element and by a lock-up clutch designed as a friction clutch in which the first input element is rotatably fixed to the crankshaft of the internal combustion engine, the second input element is rotatably fixed to the rotor of the electric motor/generator and the output element is rotatably fixed to the input shaft of the transmission and in which the lock-up clutch is situated between two elements of the summarizing gear wherein, prior to the gearshift operation, the torques of the internal combustion engine and of the electric motor/generator are reduced and the lock-up clutch is disengaged.

In addition, it is provided in this method that the torque $M\_VM$ of the internal combustion engine be reduced after a previously established time period $M\_VM\_soll=f(t)$, that the lock-up clutch, insofar as it has been at least partly engaged at the beginning of the torque reduction, be brought to the slippage limit and subsequently, on the slippage limit, be disengaged proportionally to the reducing torque $M\_VM\_ist$ of the internal combustion engine and that the torque $M\_EM\_soll$ of the electric motor/generator in the ratio of the torques $M\_EM\_ist/M\_VM\_ist$ at the beginning of the torque reduction be reduced proportionally to the torque $M\_VM\_ist$ of the internal combustion engine.

Let it be pointed out in this connection that by the expression "transmission" is to be understood all kinds of transmissions, which have a genuine neutral position with an output rotational speed "zero", that is, not to produce by a transmission internal rotational speed addition an output rotational speed with the value "zero", therefore, under the expression "transmission" fall, for example, manually shifted transmission, automated shift transmission, planetary-automatic transmissions and continuously variable transmissions.

By the thus coordinated reduction of the torques of the internal combustion engine and of the electric motor/generator, the same as the disengagement of the lock-up clutch, the torque balance existing in the summarizing gear at the beginning of the torque reduction or with the reaching of the slippage limit by the lock-up clutch is kept to a great extent up to the end of the torque reduction, and thus also the rotational speed ratios are kept constant in the summarizing gear. Inadmissible rotational speeds of the elements of the summarizing gear and of the parts connected therewith are thus prevented and subsequent synchronization operations facilitated.

Due to the relatively slow torque reduction of the internal combustion engine, a time curve $M\_VM\_soll=f(t)$ is preset therefore and the reduction of the transmissible torque $M\_K\_soll$ of the lock-up clutch and of the torque $M\_EM\_soll$ of the electric motor/generator follow the actual torque $M\_VM\_ist$ of the internal combustion engine.

The essential idea of the invention thus consists in that at the beginning of the torque reduction either a torque balance is produced in the summarizing gear and maintained until complete reduction, that is, the reaching of a zero torque by the internal combustion engine, the electric motor/generator and the lock-up clutch or that an already existing torque balance is maintained until the zero torque is reached.

Hereby, aside from differences which can be caused by fluctuations which can be produced, for example, by rotational speed and torque fluctuations of the internal combustion engine, the absolute rotational speeds and the rotational speed ratios in the summarizing gear are maintained until end of the torque reduction thus preventing an undesired divergence of the rotational speeds of the elements of the summarizing gear. Such a torque reduction represents moreover the quickest possibility of the purpose.

At the beginning of the torque reduction with overpressure, when the lock-up clutch is fully engaged, the lock-up clutch is first disengaged up to the slippage limit. Thereafter the torque $M\_VM$ of the internal combustion engine and in proportion thereto the torque $M\_EM$ of the electric motor/generator are reduced and the lock-up clutch further disengaged proportionally thereto, that is, the transmissible torque $M\_K$ of the lock-up clutch is reduced proportionally to the torque $M\_VM\_ist$ of the internal combustion engine.

When the lock-up clutch is partly engaged at the beginning of the torque reduction, the transmissible torque $M\_K$ of the lock-up clutch can first be held constant, due to the reducing torque $M\_VM\_ist$ of the internal combustion engine, until the slippage limit is reached. Thereafter the lock-up clutch is disengaged at the slippage limit in proportion to the torque $M\_VM\_ist$ of the internal combustion engine. In this procedure, small rotational speed divergences can appear in the summarizing gear. However, the lock-up clutch is thus led in the quickest way to the slippage limit and thus shortens the slippage phase that is associated with wear and heating.

Alternative to this, it is also possible to reduce the transmissible torque $M\_K$ of the lock-up clutch to the ratio of $M\_K\_ist/M\_VM\_ist$ at the beginning of the torque reduction by a corresponding disengagement proportional to the torque $M\_VM\_ist$ of the internal combustion engine, when the lock-up clutch is partly engaged at the beginning of a torque reduction. Hereby the torque balance in the summarizing gear is exactly maintained thus preventing rotational speed divergences. But for this, contrary to the above described alternative of the method, allowance is made for an extended slippage phase.

When at the beginning of the torque reduction, the lock-up clutch already is fully disengaged, the lock-up clutch remains in this state during the torque reduction.

BRIEF DESCRIPTION OF THE DRAWINGS

The invention will now be described, by way of example, with reference to the accompanying drawings in which.

DETAILED DESCRIPTION OF THE INVENTION

Figure 7:
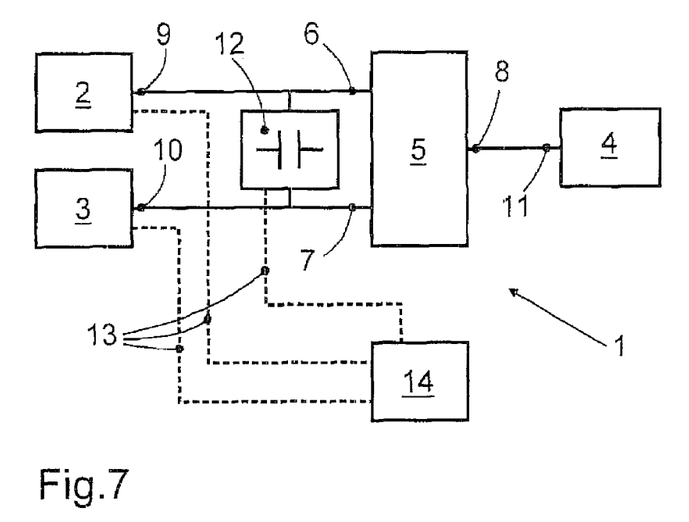
FIG. 7 is a simple diagrammatic representation of a general build up of a drivetrain.

A drivetrain 1, according to FIG. 7, comprises one internal combustion engine 2, one electric motor/generator 3 and one transmission 4 which, via a summarizing gear 5, are intercoupled with two input elements 6, 7 and one output element 8. The first input element 6 of the summarizing gear 5 is rotatably fixed to a crankshaft 9 of the internal combustion engine 2, the second input element 7 is rotatably fixed to a rotor 10 of the electric motor/generator 3 and the output element 8 is rotatably fixed to an input shaft 11 of the transmission 4. A lock-up clutch 12, designed as a friction clutch, is situated between two elements of the summarizing gear 5, in this case, between the two input elements 6, 7. The internal combustion engine 2, the electric motor/generator 3 and the lock-up clutch 12 are connected via sensor and control line 13 with a control device 14 such that the components of the drivetrain 1 can be coordinatedly controlled.

Figure 8:
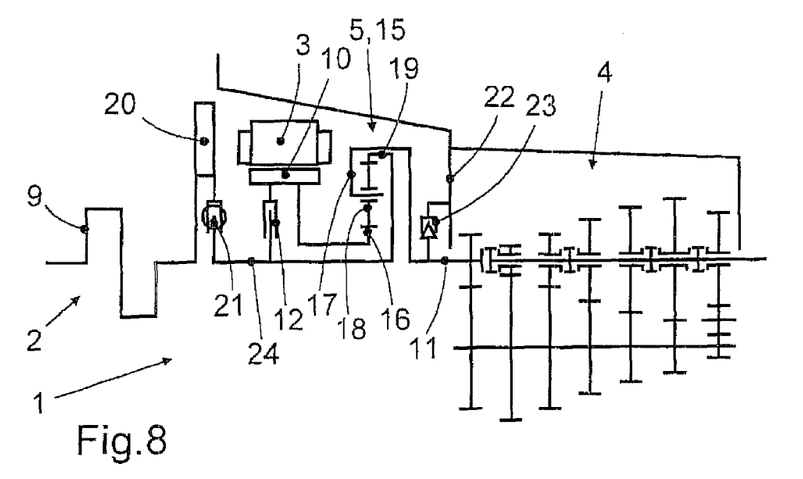
FIG. 8 is a schematized representation of a preferred practical embodiment of the drivetrain according to FIG. 7.

A preferred practical embodiment of the drivetrain 1 is shown in FIG. 8. In drivetrain 1, the summarizing gear 5 is designed as a simple planetary gearset 15 with one sun gear 16, one planet carrier 17 having several planetary gears 18 and one ring gear 19. The ring gear 19 forms the first input element 6 and is connected by a flywheel 20 and a rotational vibration damper 21 with the crankshaft 9 of the internal combustion engine 2. The sun gear 16 forms the second input element 7 and is directly connected with the rotor 10 of the electric motor/generator 3. The planet carrier 17 forms the output element 8 and is connected directly with the input shaft 11 of the transmission 4 designed as an automated shift transmission. One directional free wheel 23, located between the input shaft 11 and a housing part 22, serves for support of the input shaft 11 when the internal combustion engine 2 is started by the electric motor/generator 3.

The transmission 4 is designed in reduction gear construction type with altogether six forward gears and one reverse gear, each of which is selectably shifted by an unsynchronized dog clutch. The lock-up clutch 12 is situated between the rotor 10 of the electric motor/generator 3 and a connecting shaft 24 by which the internal combustion engine 2 is connected with the ring gear 19.

In such a drivetrain 1, prior to a gearshift operation within the transmission 4, torque freedom has to be produced on the input shaft 11 so that the activated load gear is load-free de-activated and the input target gear to be activated can be load-free synchronized and activated.

Figure 1:
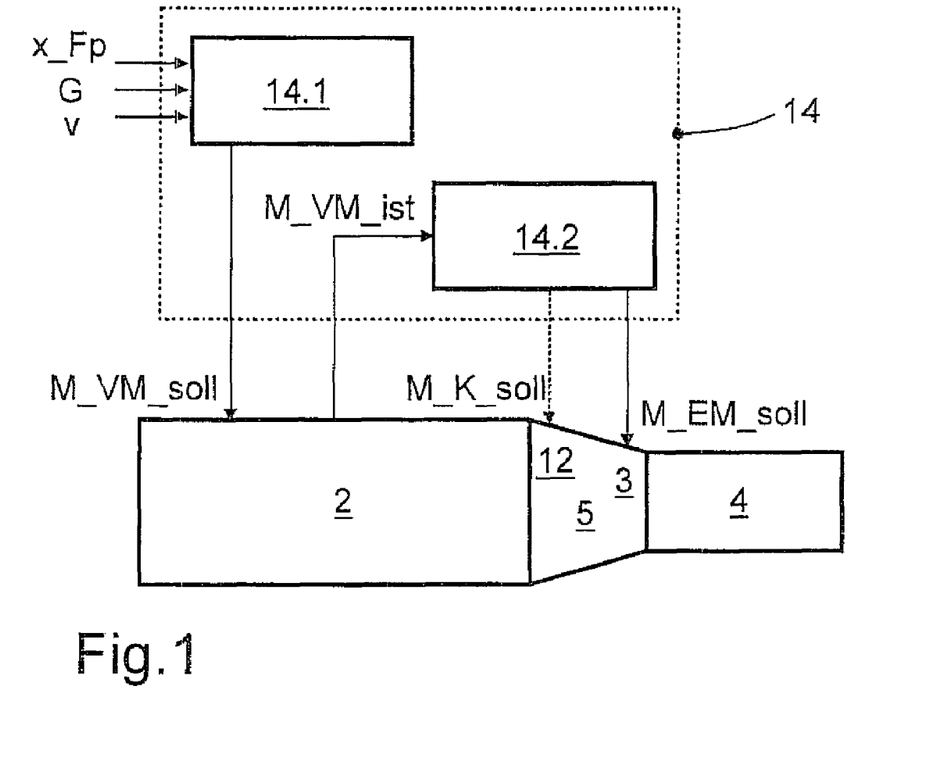
FIG. 1 is an operation diagram of the method for torque reduction prior to a gearshift.

According to the operation diagram of FIG. 1, it is provided for the purpose that the torque M_VM or M_VM_soll of the internal combustion engine 2, essentially as function of operation parameters dependent on vehicle and condition such as vehicle speed v, activated gear G and accelerator pedal position x_Fp, be reduced by presetting a time curve M_VM_soll=f(t) from a nominal value indicator 14.1 of a control device 14.

The actual value of the engine torque M_VM_ist is fed to a second nominal value indicated 14.2 of the control device 14 from which are determined the nominal values of the transmissible torque M_K_soll of the lock-up clutch 12 and of the torque M_EM_soll of the electric motor/generator 3 which are thus reduced in proportion to the curve of the internal combustion torque M_VM_ist and specifically in the electric motor/generator 3 by corresponding control of the emitted or absorbed electric power and in the lock-up clutch 12 by a corresponding pressure or directional control of the opening operation thereof.

Figure 2:
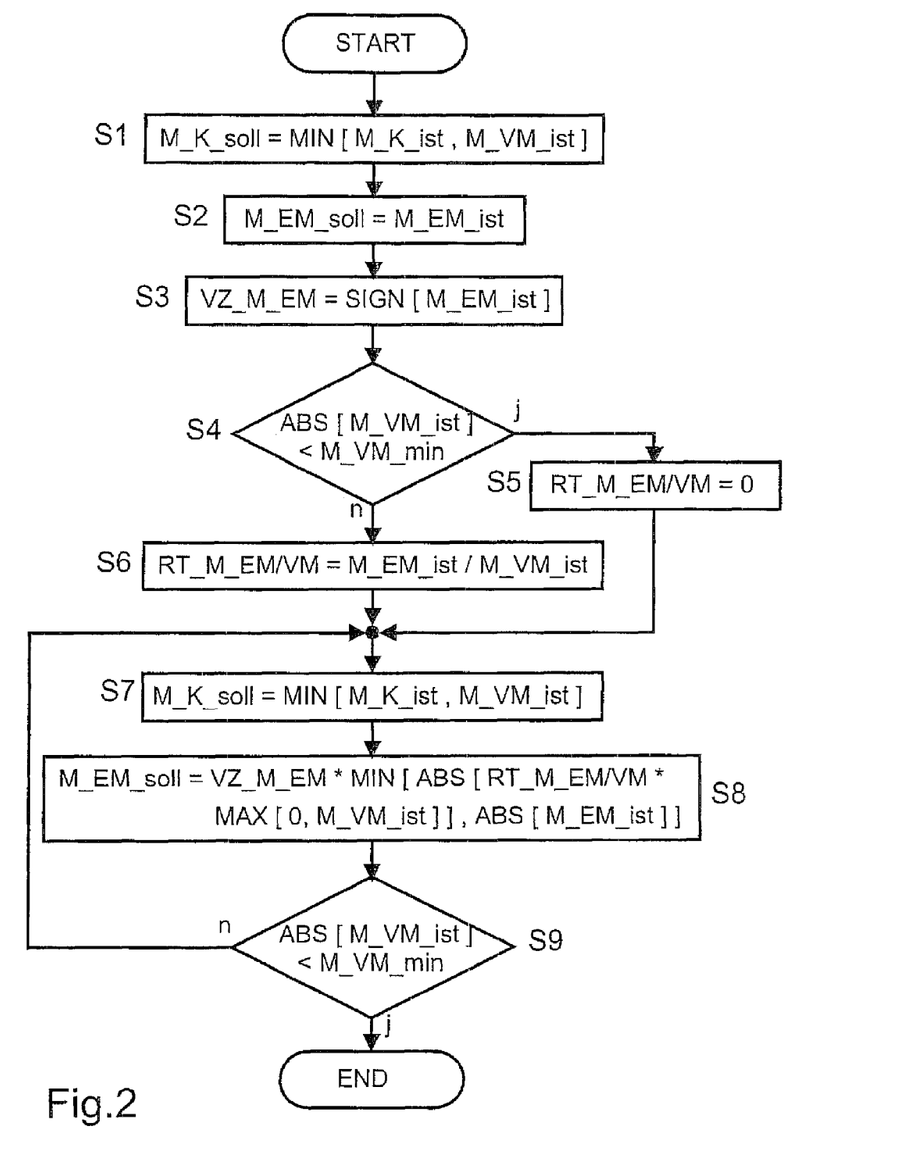
FIG. 2 is a flow chart for control of the method according to FIG. 1.

In the flow chart of FIG. 2 is shown, by way of example, the control of the lock-up clutch 12 and of the electric motor/generator 3 by determining the corresponding nominal values of torques (M_K_soll and M_EM_soll) during the torque reduction. In program or method steps S1 to S6 is carried out the initialization of initial values and, if needed, a first control step is carried out at the beginning of the method.

In step S1, the nominal torque M_K_soll of the lock-up clutch 12 is set at the minimum value from the actual torque M_K_ist of the lock-up clutch 12 and of the internal combustion engine 2. This means that the clutch torque M_K_soll, when the lock-up clutch M_K_ist $\geq$ M_VM_ist has been engaged with overpressure, drops to the actual torque M_VM_ist of the internal combustion engine, thus disengaging until the slippage limit.

With the step S2, the nominal torque M_EM_soll of the electric motor/generator 3 is initialized. In step S3 is determined the later to be used designation SIGN of the actual torque M_EM_ist of the electric motor/generator 3 at start of the torque reduction, that is, it is determined whether the electric motor/generator 3 at this moment has been operated as an engine or as a generator.

With step S4, it is examined whether the actual torque M_VM_ist of the internal combustion engine 2 is within a tolerance threshold in the proximity of a zero torque. In the positive case, the torque ratio RT_M_EM/VM of the electric motor/generator 3 and of the internal combustion engine 2 is set equal to zero in step S5 so as to prevent a division with zero.

In the negative case, the torque ratio RT_M_EM/VM in step S6 is calculated from division from the actual values of torques (M_EM_ist and M_VM_ist) at the start of the torque reduction.

With step S7, the nominal torque M_K_soll of the lock-up clutch 12 is set to the minimal value from the actual torques (M_K_ist and M_VM_ist) of the lock-up clutch 12 and of the internal combustion engine 2. Hereby a previously engaged lock-up clutch 12 is farther disengaged proportionally to the reducing actual torque M_VM_ist of the internal combustion engine 2, that is, to the slippage limit.

In case of initially small actual torque M_K_ist, that is, when the lock-up clutch 12 is at least partly disengaged, the nominal torque M_K_soll is kept until the lock-up clutch 12, due to the reducing torque M_VM_ist of the internal combustion engine 2, reaches the slippage limit (M_K_ist=M_VM_ist). From then, like in the other case, the nominal torque M_K_soll, that is, the transmissible torque, of the lock-up clutch 12 is reduced in proportion to the actual torque M_VM_ist of the internal combustion engine 2.

In step S8, by determining the nominal torque M_EM_soll of the electric motor/generator 3, the torque M_EM_ist emitted by this in the motor operation or absorbed in the generator operation is reduced proportionally to the actual torque M_VM_ist. The formula $$M\_EM\_soll = VZ\_M\_EM * MIN\,[ABS\,[RT\_M\_EM/VM * MAX\,[0, M\_VM\_IST]], ABS\,[M\_EM\_ist]]$$

here produces that the torque vibrations of the internal combustion engine 2 occurring in the proximity of the zero torque do not lead in the electric motor/generator 3 to a change between motor and generator operation by which the load reversal shocks appear and torsional vibrations would be induced. The expression VZ_M_EM stands here for designation of the torque of the electric motor/generator and ABS for the absolute value of the subsequent term.

With step S9, it is proved whether the actual torque M_VM_ist of the internal combustion engine 2 has been completely reduced within a preset tolerance threshold. In the positive case, the torque reduction is terminated. In the negative case, the steps S7 and S8 are carried out until the condition of step S9 is met.

Figure 3:
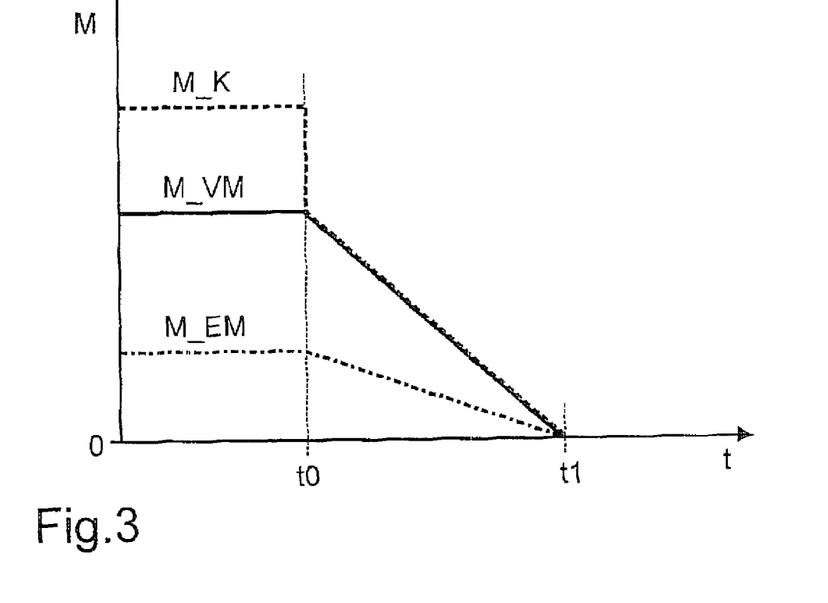
FIG. 3 is a first utilization example for torque reduction prior to a gearshift in the form of a torque diagram.

In FIG. 3 are now shown the torque curves for a utilization example in which prior to the beginning of the torque reduction (t>t0) the lock-up clutch 12 is engaged with overpressure (M_K>M_VM) and the electric motor/generator 3 is operated as motor (M_EM>0). At the beginning of the torque reduction (t=t0) the lock-up clutch 12 is first disengaged up to the slippage limit (M_K=M_VM). Subsequently, the torques of the lock-up clutch (M_K) and of the electric motor/generator (M_EM) are reduced in proportion to the torque (M_VM) of the internal combustion engine 2. Hereby all torques (M_VM, M_K, M_EM) simultaneously reach their neutral value at the moment t1. Since the torque balance existing at the start of the torque reduction (t=t0) in the summarizing gear 5, 15 is extensively maintained until the end (t=t1), no rotational speeds worth mentioning appear in the summarizing gear 5, 15. The inventive method likewise constitutes the quickest way of torque reduction.

Figure 4:
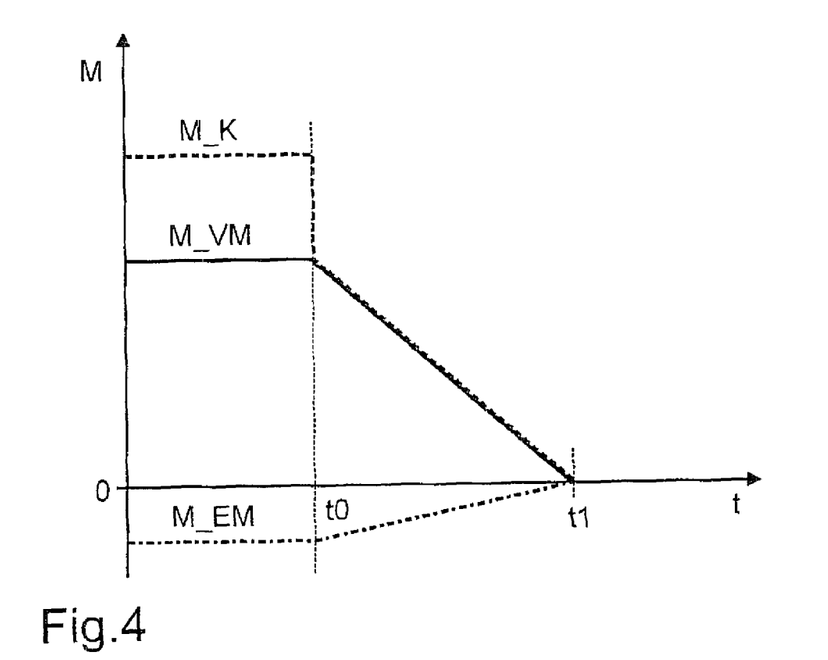
FIG. 4 is a second utilization example for torque reduction prior to a gearshift in the form of a torque diagram.

In FIG. 4 are shown the torque curves for a utilization example which, to a great extent, is identical with that according to FIG. 3. The only difference consists in that the electric motor/generator 3, prior to beginning of the torque reduction (t>t0), is operated as generator (M_EM<0). After disengaging of the lock-up clutch 12 to the slippage limit (M_K=M_VM) the torques of the lock-up clutch 12 (M_K) and of the electric motor/generator 3 (M_EM) are, in turn, reduced to zero proportionally to the torque (M_VM) of the internal combustion engine 2.

Figure 5:
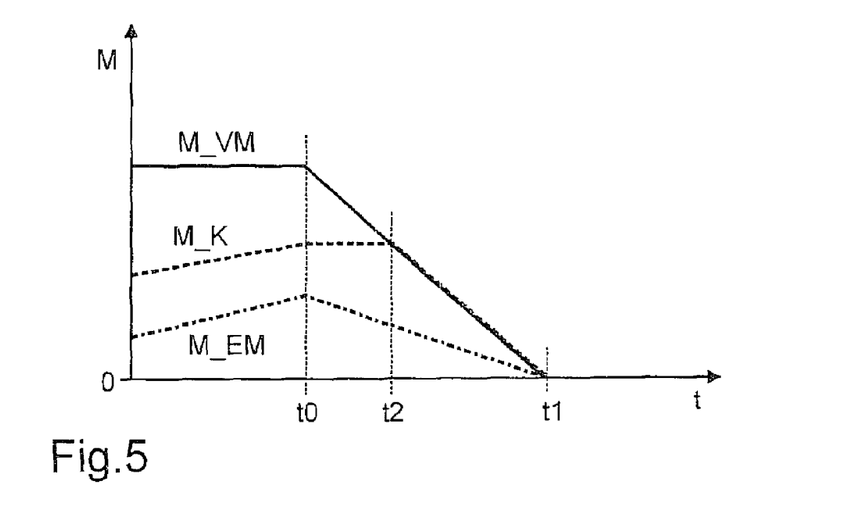
FIG. 5 is a third utilization example for torque reduction prior to a gearshift in the form of a torque diagram.
Figure 6:
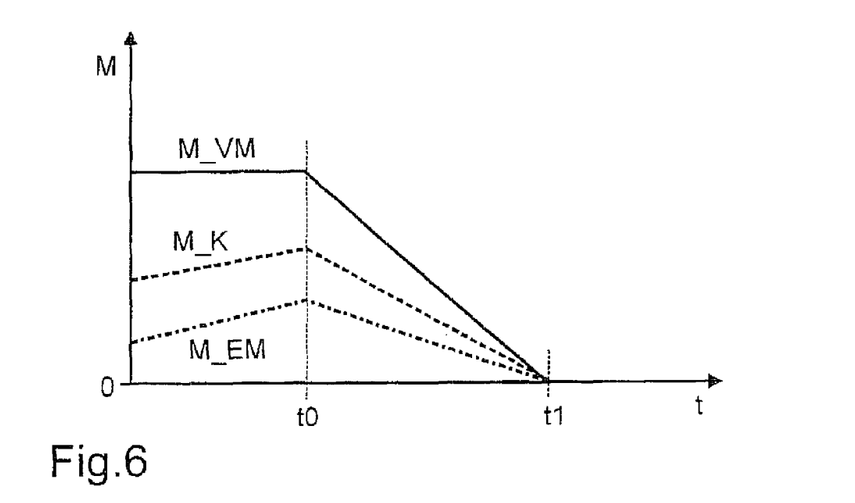
FIG. 6 is a fourth utilization example for torque reduction prior to a gearshift in the form of a torque diagram.

In FIG. 5 and FIG. 6, on the other hand, are shown torque curves where the motor vehicle concerned at the moment of the gearshift requirement is in a starting operation, the electric motor/generator 3 is operated as motor (M_EM>0) and the lock-up clutch 12 is in slippage state (M_K<M_VM) and in the engaging process.

In a first alternative of the method, according to FIG. 5, the lock-up clutch 12, at the beginning of the torque reduction (t=t0) is kept at the concerned transmissible torque M_K until at the moment t=t2, it hits the slippage limit, due to the reducing torque of the internal combustion engine 2. Subsequently, the lock-up clutch 12 is held at the slippage limit (M_K=M_VM) and thus proportionally disengaged to the reducing torque M_VM of the internal combustion engine 2. The torque (M_E) of the electric/generator 3 is, on the other hand, reduced from the beginning on proportionally to the torque (M_VM) of the internal combustion engine 2 until zero. Although the constant maintenance of the transmissible torque M_K of the lock-up clutch in the time period t=t0 to t=t2 produces a slight imbalance in the summarizing gear 5, the slippage phase of the lock-up clutch 12 is nonetheless abbreviated.

In a second method alternative, according to FIG. 6, under the same operating conditions as in the example of FIG. 5, the lock-up clutch 12, from the beginning of the torque reduction (t=t0), disengages proportionally to the torque (M_VM) of the internal combustion engine 2. Hereby is prevented an unbalance in the summarizing gear 5, but the slippage phase of the lock-up clutch 12 is extended.

Independently of the embodiments shown in FIGS. 7 and 8, the invention comprises also the application of the method to drivetrains with all other possible and different drive couplings between the internal combustion engine 2, the electric motor/generator 3, the summarizing gear 5, the clutch 12 and the transmission 4, which however is not separately shown here.

| Reference numerals | | |
|---|---|---|
| 1 | drivetrain | ABS | absolute value |
| 2 | internal combustion engine | f(t) | time function |
| 3 | electric motor/generator | G | activated gear |
| 4 | transmission, | M | torque |
|   | automated shift transmission | M_EM | torque of 3 |
| 5 | summarizing gear | E_EM_ist | actual torque of 3 |
| 6 | (first) input element | M_EM_soll | nominal torque of 3 |
| 7 | (second) input element | M_K | (transmissible) torque |
| 8 | output element |  | of 12 |
| 9 | crankshaft | M_K_ist | actual torque of 12 |
| 10 | rotor | M_K_soll | nominal torque of 12 |
| 11 | input shaft | M_VM | torque of 2 |
| 12 | lock-up clutch | M_VM_ist | actual torque of 2 |
| 13 | sensor and control line | M_VM_min | limit value of M_VM |
| 14 | control device | M_VM_soll | nominal torque of 2 |
| 14.1 | nominal value transmitter | MAX | maximal value |
| 14.2 | nominal value transmitter | MIN | minimal value |
| 15 | planetary transmission | RT_M_EM/VM | torque ratio |
| 16 | sun gear | SIGN | sign digit |
| 17 | planet carrier | S1-S9 | method steps |
| 18 | planetary gear | t | time |
| 19 | ring gear | t0 | moment |
| 20 | flywheel | t1 | moment |
| 21 | rotational vibration damper | t2 | moment |
| 22 | housing part | V | vehicle speed |
| 23 | direction free wheel | VZ_M | sign digit of torque |
| 24 | connecting shaft | x_Fp | accelerator pedal position |

The invention claimed is:

1. A method for controlling a torque output from a motor vehicle drive train and into a transmission in preparation for a gear shift operation of the transmission, the motor vehicle drive train including an internal combustion engine (2), an electric motor/generator (3) and a summarizing gear (5/15), a crankshaft (9) of the internal combustion engine (2) being releasably connected to a lock-up clutch (12) and fixedly connected to a first input element (6) of the summarizing gear (5, 15), a rotor (10) of the electric motor/generator (3) being releasably connected to the lock-up clutch (12) and fixedly connected to a second input element (7) of the summarizing gear (5, 15), the internal combustion engine and the electric motor/generator being inter-coupled to each other via both the summarizing gear (5, 15) and the lock-up clutch, the summarizing gear (5, 15) comprising the first input element (6), the second input element (7), and an output element (8), the output element (8) being fixed to an input shaft (11) of the transmission (4), and the lock-up clutch (12) being arranged between the first and the second input elements (6, 7) of the summarizing gear (5, 15), the method comprising the steps of:

initiating a torque reduction process (t=0) with the lock-up clutch (12) being at least partially engaged at the initiation of the torque reduction process (t=0);

determining a ratio (M_EM_ist/M_VM_ist) of an initial torque of the electric motor/generator (M_EM_ist) to an initial torque of the internal combustion engine (M_VM_ist);

reducing a torque (M_VM) of the internal combustion engine (2) based on a previously defined time curve (M_VM_soll=f(t));

reducing a transmissible torque (M_K) of the lock-up clutch (12) proportionally to a rate of reduction of torque (M_VM_soll) in the internal combustion engine (2) until the lock-up clutch (12) is completely disengaged; and     reducing an absolute value of a torque (M_EM_soll) of the electric motor/generator (3) proportionally to the rate of reduction of torque (M_VM_soll) in the internal combustion engine (2), such that the ratio of the torque of the electric motor/generator to the torque of the internal combustion engine is held substantially constant.

2. The method according to claim 1, further comprising the step of one of increasing or decreasing the level of transmissible torque (M_K) of the lock-up clutch (12) until a clutch slippage limit is reached, before reducing the transmissible torque (M_K) of the lock-up clutch (1) proportionally to the rate of reduction of torque (M_VM_soll) in the internal combustion engine (2).

3. The method according to claim 1, further comprising the step maintaining the level of transmissible torque (M_K) of the lock-up clutch (12) until a clutch slippage limit is reached, before reducing the transmissible torque (M_K) of the lock-up clutch (12) proportionally to the rate of reduction of torque (M_VM_soil) in the internal combustion engine (2).

4. The method according to claim 1, further comprising the step of, if the lock-up clutch (12) is completely disengaged at the initiation of the torque reduction process (t=t0), maintaining disengagement of the lock-up clutch (12) during the torque reduction process (t=t0 to t=t1).

5. The method according to claim 1, further comprising the step of, if the electric motor/generator (3) is functioning as a generator at the initiation of the torque reduction process (t=t0), increasing the value of torque (M_EM) of the electric motor/generator (3) proportionally to the rate of reduction of torque (M_VM_soll) in the internal combustion engine (2), such that a ratio of the torque of the electric motor/generator to the torque of the internal combustion engine is maintained substantially constant.

6. The method according to claim 1, further comprising the step of, if the electric motor/generator (3) is functioning as a motor at the initiation of the torque reduction process (t=t0), decreasing the value of torque (M_EM) of the electric motor/generator (3) proportionally to the rate of reduction of torque (M_VM_soll) in the internal combustion engine (2), such that a ratio of the torque of the electric motor/generator to the torque of the internal combustion engine is maintained substantially constant.

7. The method according to claim 1, further comprising the steps of initiating the torque reduction process (t=0) upon an appearance of a gearshift requirement, and shifting a gear of the transmission (4) after the lock-up clutch (12) has been fully disengaged.

8. The method according to claim 1, further comprising the step of directly connecting the crankshaft (9) of the internal combustion engine (2) to both the lock-up clutch (12) and the summarizing gear (5, 15).

9. The method according to claim 8, further comprising the step of directly connecting the rotor (10) to both the lock-up clutch (12) and the summarizing gear (5, 15).

10. A method for controlling a torque output from a motor vehicle drive train and into a transmission in preparation for a gear shift operation of the transmission, the motor vehicle drive train including an internal combustion engine (2), an electric motor/generator (3) and a summarizing gear (5/15), the summarizing gear (5, 15) being a planetary gear set (15), a crankshaft (9) of the internal combustion engine (2) being releasably connected to a lock-up clutch (12) and fixedly connected to a first input element (6) of the summarizing gear (5, 15), a rotor (10) of the electric motor/generator (3) being releasably connected to the lock-up clutch (12) and fixedly connected to a second input element (7) of the summarizing gear (5, 15), the internal combustion engine and the electric motor/generator being inter-coupled to each other via both the summarizing gear (5, 15) and the lock-up clutch, the summarizing gear (5, 15) comprising the first input element (6), the second input element (7), and an output element (8), the output element (8) of the summarizing gear (5, 15) being permanently connected to an input shaft (11) of the transmission (4), and the lock-up clutch (12) being arranged between the first and the second input elements (6, 7) of the summarizing gear (5, 15), the method comprising the steps of:

initiating a torque reduction process (t=0) with the lock-up clutch (12) being at least partially engaged at the initiation of the torque reduction process (t=0);

determining a ratio (M_EM_ist/M_VM_ist) of an initial torque of the electric motor/generator (M_EM_ist) to an initial torque of the internal combustion engine (M_VM_ist);

reducing a torque (M_VM) of the internal combustion engine (2) based on a previously defined time curve (M_VM_soll=f(t));

reducing a transmissible torque (M_K) of the lock-up clutch (12) proportionally to a rate of reduction of torque (M_VM_soll) in the internal combustion engine (2) until the lock-up clutch (12) is completely disengaged; and     reducing an absolute value of a torque (M_EM_soll) of the electric motor/generator (3) proportionally to the rate of reduction of torque (M_VM_soll) in the internal combustion engine (2), such that the ratio of the torque of the electric motor/generator to the torque of the internal combustion engine is held substantially constant.

11. The method according to claim 10, further comprising the step of fixedly connecting the crankshaft (9) of the internal combustion engine (2) to one of a ring gear (19) and a sun gear (16) of the planetary gear set (15), and fixedly connecting the rotor (10) of the electric motor/generator (3) to the other of the ring gear (19) and the sun gear (16) of the planetary gear set (15).

12. The method according to claim 11, further comprising the step of one of increasing or decreasing the level of transmissible torque (M_K) of the lock-up clutch (12) until a clutch slippage limit is reached, before reducing the transmissible torque (M_K) of the lock-up clutch (12) proportionally to the rate of reduction of torque (M_VM_soll) in the internal combustion engine (2).

13. The method according to claim 11, further comprising the step maintaining the level of transmissible torque (M_K) of the lock-up clutch (12) until a clutch slippage limit is reached, before reducing the transmissible torque (M_K) of the lock-up clutch (12) proportionally to the rate of reduction of torque (M_VM_soll) in the internal combustion engine (2).

14. The method according to claim 10, further comprising the step of one of increasing or decreasing the level of transmissible torque (M_K) of the lock-up clutch (12) until a clutch slippage limit is reached, before reducing the transmissible torque (M_K) of the lock-up clutch (12) proportionally to the rate of reduction of torque (M_VM_soll) in the internal combustion engine (2).

15. The method according to claim 10, further comprising the step maintaining the level of transmissible torque (M_K) of the lock-up clutch (12) until a clutch slippage limit is reached, before reducing the transmissible torque (M_K) of the lock-up clutch (12) proportionally to the rate of reduction of torque (M_VM_soll) in the internal combustion engine (2).

16. The method according to claim 10, further comprising the step of, if the lock-up clutch (12) is completely disengaged at the initiation of the torque reduction process (t=t0), maintaining disengagement of the lock-up clutch (12) during the torque reduction process (t=t0 to t=t1).

17. The method according to claim 10, further comprising the step of, if the electric motor/generator (3) is functioning as a generator at the initiation of the torque reduction process (t=t0), increasing the value of torque (M_EM) of the electric motor/generator (3) proportionally to the rate of reduction of torque (M_VM_soll) in the internal combustion engine (2), such that a ratio of the torque of the electric motor/generator to the torque of the internal combustion engine is held substantially constant.

18. The method according to claim 10, further comprising the step of, if the electric motor/generator (3) is functioning as a motor at the initiation of the torque reduction process (t=tO), decreasing the value of torque (M_EM) of the electric motor/generator (3) proportionally to the rate of reduction of torque (M_VM_soll) in the internal combustion engine (2), such that a ratio of the torque of the electric motor/generator to the torque of the internal combustion engine is held substantially constant.

19. The method according to claim 10, further comprising the step of only shifting a gear of the transmission (4) after the lock-up clutch (12) is fully disengaged.

20. The method according to claim 10, further comprising the step of directly connecting the crankshaft (9) of the internal combustion engine (2) to both the lock-up clutch (12) and the planetary gear set (15) and directly connecting the rotor (10) to both the lock-up clutch (12) and the planetary gear set (15).

* * * * *